United States Patent [19]
Narreau

[11] Patent Number: 5,095,712
[45] Date of Patent: Mar. 17, 1992

[54] ECONOMIZER CONTROL WITH VARIABLE CAPACITY

[75] Inventor: Peter P. Narreau, Pennellville, N.Y.

[73] Assignee: Carrier Corporation, Syracuse, N.Y.

[21] Appl. No.: 695,353

[22] Filed: May 3, 1991

[51] Int. Cl.⁵ .............................. F25B 7/00; F25B 41/00
[52] U.S. Cl. ........................................ 62/113; 62/117; 62/200; 62/175; 62/513
[58] Field of Search ................. 62/113, 117, 217, 199, 62/200, 175, 204, 224, 225, 510, 513

[56] References Cited

U.S. PATENT DOCUMENTS

| | | | |
|---|---|---|---|
| 2,388,556 | 11/1945 | Lathrop | 62/175 |
| 2,717,765 | 9/1955 | Lawler, Jr. | 62/175 X |
| 3,150,498 | 9/1964 | Blake | 62/175 X |
| 4,316,366 | 2/1982 | Manning | 62/513 X |
| 4,696,168 | 9/1987 | Woods et al. | 62/200 |
| 4,787,211 | 11/1988 | Shaw | 62/117 |

*Primary Examiner*—Harry B. Tanner

[57] ABSTRACT

A refrigeration circuit is provided in which economizer control is provided together with variable capacity control. Constant cooling is achieved by controlling an economizer cycle responsive to the suction pressure of the compressor. Additionally, compressor discharge temperature is controlled by controlling the portion of liquid refrigerant supplied to the interstage line.

8 Claims, 2 Drawing Sheets

ECONOMIZER CONTROL WITH VARIABLE CAPACITY

BACKGROUND OF THE INVENTION

In refrigeration systems such as those used for cooling food cases in grocery stores, it is necessary to maintain a constant temperature in the cases to ensure the quality of their contents. Shopping patterns, items being on sale, the cleaning and stocking of the cases all contribute to varying the cooling load on the evaporators cooling the respective cases. To create variable capacity control and to maintain tight tolerance in suction pressure or refrigerated space temperature, it is conventional to control capacity by cycling or unloading compressors. Both methods cause the suction pressure to fluctuate and consequently the refrigerated space temperature varies. The use of inverter drives is effective but very expensive. Additionally, two-stage internally compounded compressors (compound cooling compressors) cannot easily be applied with cylinder unloading. Where an economizer is used, the thermal expansion valve (TXV) is controlled by interstage and/or discharge temperature.

SUMMARY OF THE INVENTION

Only the suction pressure and refrigerated space temperature are an indication of the actual conditions in the refrigerated space. Refrigerated space design temperature can be maintained within a close tolerance through variation in liquid temperature (i.e. varying the refrigeration effect) based on suction pressure or refrigerated space temperature. The use of an additional electronic expansion valve (EXV) to maintain a maximum discharge temperature of, for example, 250° F. ensures satisfactory interstage desuperheating.

It is an object of this invention to provide a method and apparatus for variable capacity control together with very tight control of the refrigerated space temperature.

It is another object of this invention to control the temperature of the liquid refrigerant supplied to the evaporator based upon suction pressure or the temperature in the refrigerated space. These objects, and others as will become apparent hereinafter, are accomplished by the present invention.

Basically in a two-stage system a first EXV, responsive to the suction pressure, diverts part of the flow coming from the condenser and directs it into the economizer where it engages in a heat exchange relationship with the remaining flow before being injected at an interstage point. A second EXV, responsive to compressor discharge temperature, diverts part of the flow from the economizer to the evaporator and combines the flow with that diverted by the first EXV for injection at an interstage point. In a single-stage system with a separate subcooler, the EXV in the subcooler circuit is controlled responsive to the suction pressure in the main circuit.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
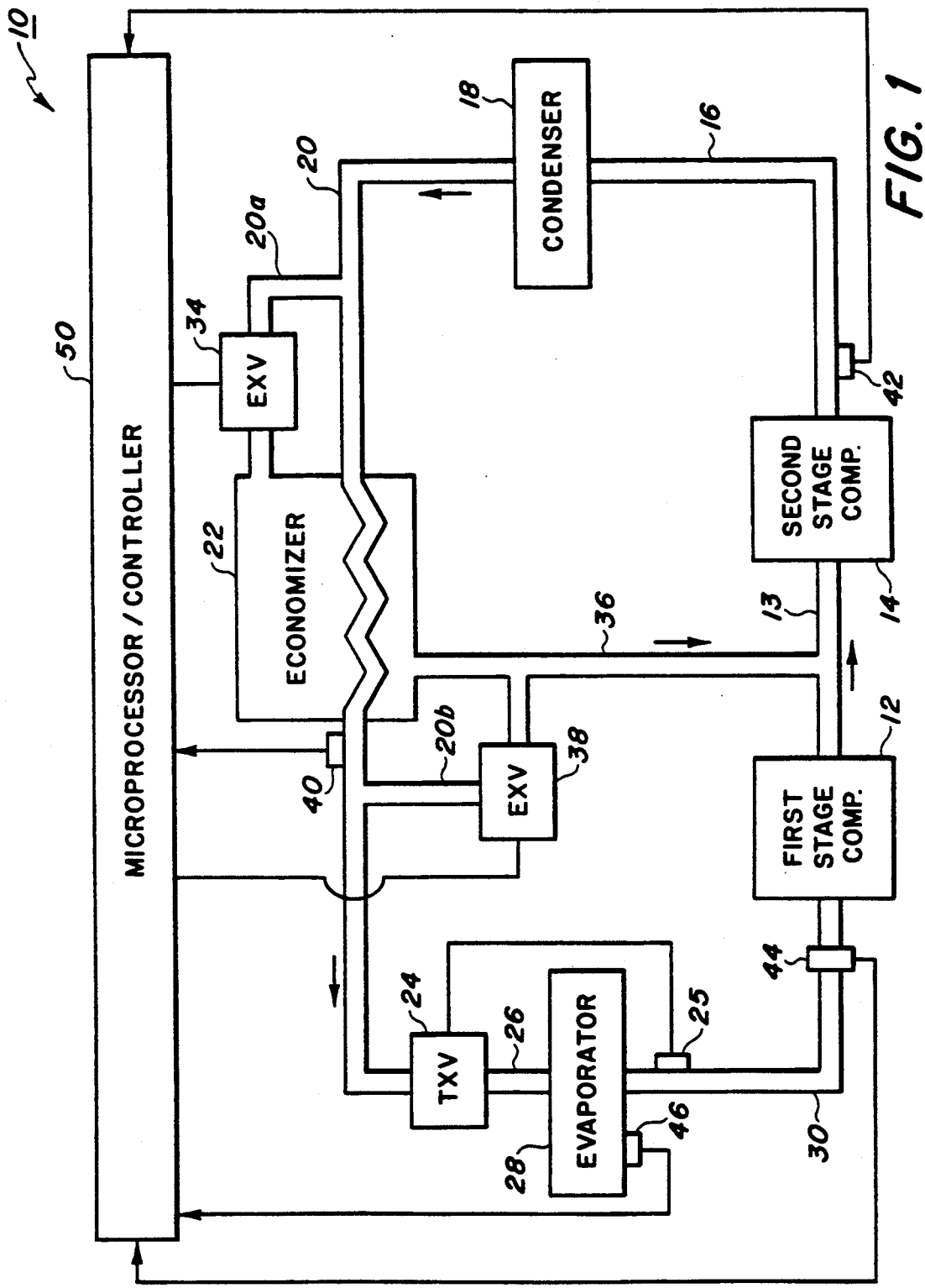
FIG. 1 is a schematic representation of a two-stage compressor system employing the present invention.

In FIG. 1, the numeral 10 generally designates a refrigeration circuit. Refrigeration circuit 10 includes a first-stage compressor 12 and a second-stage compressor 14 which may be a separate compressor or a portion of the same compressor. Compressors 12 and 14 are connected via interstage line 13 and serially compress suction gas to a higher temperature and pressure and deliver it via discharge line 16 to condenser 18. In condenser 18, the hot refrigerant gas gives up heat to the condenser air thereby cooling the compressed gas and changing the state of the refrigerant from a gas to a liquid. Liquid refrigerant flows from condenser 18 via liquid line 20 through economizer 22 to TXV 24. As the liquid refrigerant passes through the orifice of TXV 24, some of the liquid refrigerant vaporizes into a gas (flash gas). The mixture of liquid and gaseous refrigerant passes via distributor tubes 26 to the evaporator 28. Heat is absorbed from the evaporator air by the refrigerant by the balance of the liquid refrigerant causing it to vaporize in the coil of evaporator 28 thereby providing refrigeration to the case (not illustrated) in which evaporator 28 is located. The vaporized refrigerant then flows via suction line 30 to first-stage compressor 12 to complete the fluid circuit. The sensing bulb 25 of TXV 24 is located on suction line 30 between evaporator 28 and first-stage compressor 12 so that TXV 24 regulates the amount of refrigerant delivered to the evaporator 28 to establish a given superheat at the outlet of evaporator 28. The refrigerant circuit described so far is generally conventional.

Line 20a branches from liquid line 20 upstream of economizer 22 and leads to economizer 22 such that refrigerant passing into economizer 22 via line 20a is in heat transfer relationship with liquid refrigerant passing through economizer 22 via liquid line 20. Flow through branch line 20a is controlled by EXV 34. Refrigerant flowing into economizer 22 via branch line 20a passes from economizer 22 via line 36 which feeds into interstage line 13 and thence into second-stage compressor 14. Line 20b branches from liquid line 20 downstream of economizer 22 and connects with line 36. Flow through branch line 20b is controlled by EXV 38.

A microprocessor or controller 50 is operatively connected to EXVs 34 and 38. Additionally, microprocessor 50 is connected to temperature sensor 40 which is located on line 20 at or near the outlet of economizer 22 and upstream of branch 20b and to temperature sensor 42 which is located in discharge line 16 at or near the discharge of second-stage compressor 14. Controller 50 is also connected to a pressure sensor or transducer 44 located in suction line 30 and/or a temperature sensor 46 located in the food case and on or near evaporator 28. Pressure sensor 44 and temperature sensor 46 are generally redundant so that one may be eliminated if desired, but the use of pressure sensor 44 is generally preferred with or without temperature sensor 46. In the above described system, first and second-stage compressors 12 and 14, respectively, may be controlled by controller 50 or by any other suitable means.

Although the refrigeration circuit 10 is complete, it may be modified to include banks of two-stage compressors in parallel. In such a circuit, condenser 18 and economizer 22 would be common but parallel banks of two-stage compressors would feed condenser 18 and, downstream of branch 20b, liquid line 20 would divide into a plurality of lines each containing a TXV corresponding to 24 and an evaporator corresponding to 28. The discharges from the evaporators would be manifolded to supply the banks of compressors which would be controlled by controller 50 so that only the necessary number of compressors is being operated. Pressure sensor 44 would be located in a common suction line or header.

The operation of refrigeration circuit 10 is such that refrigerant supplied to first-stage compressor 12 via suction line 30 is compressed and fed to second-stage compressor 14 via interstage line 13 together with whatever refrigerant is being supplied to line 36 via EXVs 34 and 38. The output of second-stage compressor 14 is supplied to condenser 18 where the hot refrigerant gas is condensed to a liquid and liquid refrigerant flows through economizer 22 via line 20. If EXV 34 is open, a portion of the liquid refrigerant is diverted via line 20a into economizer 22 where it evaporates causing further cooling of the liquid refrigerant in line 20 as it passes through economizer 22. The gaseous refrigerant passes from economizer 22 via line 36 and is supplied to second-stage compressor 14 via interstage line 13. Liquid refrigerant passing through economizer 22 via line 20 passes to evaporator 28 via TXV 24 and distributor tubes 26. Additionally, if EXV 38 is open, liquid refrigerant is also diverted via branch line 20b into line 36 where it causes cooling and/or condensing of the gaseous refrigerant passing from economizer 22. TXV 24 controls the flow through evaporator 28 responsive to the temperature sensed by sensor 25 and thereby controls the enthalpy or refrigeration effect.

Controller 50 controls EXV 34 responsive to the suction pressure sensed by pressure sensor 44 and/or the temperature in the case sensed by temperature sensor 46. Alternatively, EXV 34 can be replaced by a reverse acting constant pressure valve directly controlled by suction pressure to control the subcooling. EXV 38 is controlled by controller 50 responsive to the discharge temperature sensed by temperature sensor 42 to limit the discharge temperature of second-stage compressor 14 to a predetermined level such as 250° F. by lowering the temperature of the gas and/or causing liquid refrigerant to be supplied to interstage line 13 and second-stage compressor 14. The temperature sensed by temperature sensor 40 may be used to determine the refrigeration effect available at evaporator 28. EXV 38 may be replaced by a mechanical TXV controlled by discharge temperature.

Figure 2:
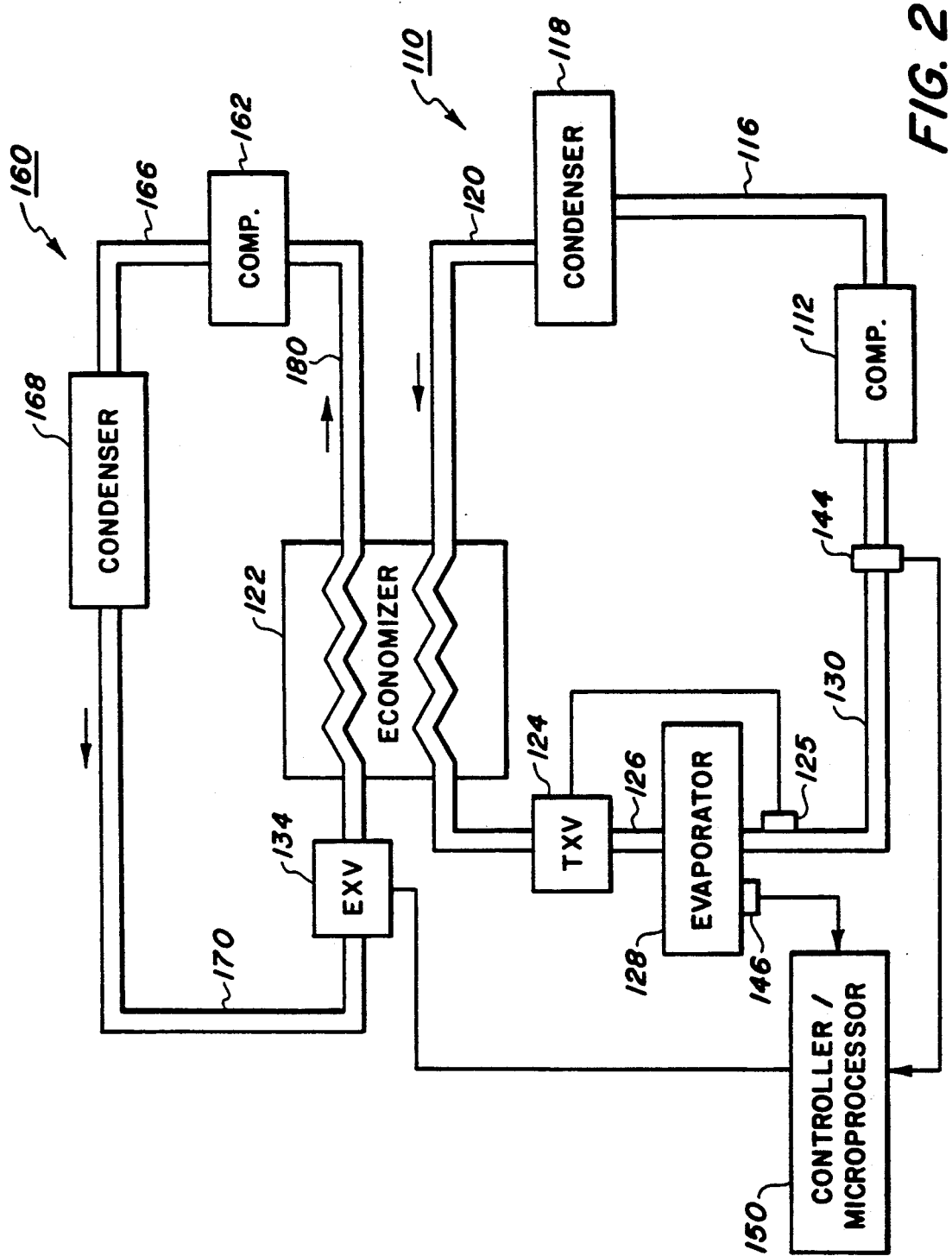
FIG. 2 is a schematic representation of a single stage compressor system with a separate subcooler.

Referring now to FIG. 2, the various components have been labeled 100 higher than the corresponding components in FIG. 1. Refrigeration circuit 110 serially includes single stage compressor 112, discharge line 116, condenser 118, liquid line 120 which passes through economizer 122 to TXV 124 thence via distribution tubes 126 into evaporator 128 and suction line 130 back to compressor 112. Subcooler circuit 160 serially includes single stage compressor 162, discharge line 166, condenser 168, liquid line 170, EXV 134, subcooler 122 which is the evaporator of circuit 160, thence via suction line 180 back to compressor 162. Microprocessor or controller 150 is connected to pressure transducer 144 in suction line 130 and EXV 134 in line 170 as well as to temperature sensor 146 which is located in the food case and on or near evaporator 128. As in the case of refrigeration circuit 10, a plurality of compressors 112 may be in parallel and connect to common condenser 118 and economizer 122. A plurality of evaporators 128 with corresponding TXVs 124 would feed a manifold connected to the suction side of the rack of compressors 112. If a rack of compressors 112 is used, the controller 150 will control the compressors 112. Additionally, subcooling circuit 160 may include multiple compressors.

In operation of the circuits 110 and 160 of FIG. 2, subcooler circuit 160 is controlled by controller 150 through EXV 134. EXV 134 controls the heat exchange between the two circuits in economizer 122 and thereby the temperature of the liquid refrigerant supplied to TXV(s) 124 and thereby to evaporator(s) 128. The EXV 134 is controlled by controller 150 responsive to the suction pressure as sensed by pressure sensor 144.

Although preferred embodiments of the present invention have been illustrated and described, other changes will occur to those skilled in the art. It is therefore intended that the scope of the present invention is to be limited only by the scope of the appended claims.

What is claimed is:

1. A refrigeration circuit for providing economizer control comprising:
    said refrigeration circuit including a continuous fluid path serially including compressor means, discharge line means, condenser means, liquid line means passing through an economizer means, expansion means, evaporator means, and suction line means containing pressure sensing means;
    means for supplying refrigerant to said economizer means in a heat transfer relationship with said liquid line passing through said economizer means; and
    means for controlling said means for supplying refrigerant to said economizer means responsive to said pressure sensing means whereby the temperature of refrigerant in said liquid line means is controlled.

2. The refrigeration circuit of claim 1 wherein said means for supplying refrigerant to said economizer means is a subcooler refrigeration circuit in which said economizer means defines an evaporator means in said subcooler refrigeration circuit.

3. The refrigeration circuit of claim 1 wherein said compressor means includes first and second-stage compressor means connected by an interstage line and said refrigerant supplied to said economizer means in heat transfer relationship with said liquid line is subsequently supplied to said interstage line.

4. The refrigeration circuit of claim 3 further including means for regulating the temperature of said refrigerant subsequently supplied to said interstage line.

5. A method for providing economizer control in a refrigeration circuit including a continuous fluid path serially including compressor means, discharge line means, condenser means, liquid line means passing through economizer means, expansion means, evaporator means and suction line means comprising the steps of:
    supplying refrigerant to said economizer means in a heat transfer relationship with said liquid line passing through said economizer means;
    sensing the pressure in said suction line means; and controlling the supplying of refrigerant to said economizer means responsive to the pressure sensed in said suction line.

6. The method of claim 5 wherein the step of controlling the supplying of refrigerant includes the controlling of a subcooler refrigeration circuit.

7. The method of claim 5 wherein the step of supplying refrigerant to said economizer means includes the subsequent supplying of the refrigerant to an interstage of said compressor means.

8. The method of claim 7 further including the step of controlling the temperature of the refrigerant supplied to the interstage of said compressor means.

* * * * *